3,337,624
AMIDES OF 4,5,6-TRICHLOROISOPHTHALIC ACID

Paul E. Hoch, Youngstown, N.Y., assignor to Hooker Chemical Corporation, Niagara Falls, N.Y., a corporation of New York
No Drawing. Filed Feb. 25, 1965, Ser. No. 435,362
2 Claims. (Cl. 260—558)

This is a continuation-in-part of my application S.N. 214,805, filed Aug. 6, 1962, now U.S. Patent 3,221,044, as a continuation-in-part of application S.N. 818,543, filed June 8, 1959, now abandoned.

This invention relates to the amides of a trichloro aromatic dicarboxylic acid and novel methods for preparing such amides and derivatives thereof.

These compounds are useful in the preparation of polymers which are flame retardant in nature. The compounds of the invention can also be used as flameproofing agents, for example, in polymers such as polyamides and polyesters. In addition, the compounds of the invention find utility as chemical intermediates.

In accordance with this invention, the amides of 4,5,6-trichloroisophthalic acid are prepared from 4,5,6-trichloroisophthaloyl chloride, which is prepared from the corresponding acid. The 4,5,6-trichloroisophthalic acid can be prepared from 4,5,6,α,α,α-hexachloro-3-toluyl chloride.

The compound 4,5,6,α,α,α-hexachloro-3-toluyl chloride is produced by heating 3,4,5,6,7,7-hexachloro-3,6-methano-1,2,3,6-tetrahydrophthaloyl chloride at a temperature of about 180 to 220 degrees centigrade. The chlorotoluyl chloride is reacted with a base such as the hydroxides of the alkali metals, sodium, potassium, rubidium and cesium, to produce the dialkali metal salt of 4,5,6-trichloroisophthalic acid. The salt is then acidified to produce 4,5,6-trichloroisophthalic acid. Suitable acidifying agents are the strong mineral acids such as hydrochloric acid, nitric acid, sulfuric acid and phosphoric acid, as well as strong organic acids such as toluene sulfonic acid and phenol sulfonic acid. The trichloroisophthalic acid is converted to the acid chloride by reaction with a suitable reagent such as phosphorus pentachloride.

Amides of 4,5,6-trichloroisophthalic acid are prepared by reacting the corresponding acid chloride with ammonia or an organic amine. The preferred amines are the aliphatic monoamines and diamines having one to six carbon atoms in the aliphatic radicals, such as methylamine, ethylamine, propylamine, isopropylamine, butylamine, amylamine, hexylamine, cyclohexylamine, dimethylamine, diethylamine, dipropylamine, diisopropylamine, dibutylamine, diamylamine, dihexylamine and dicyclohexylamine. At least the stoichiometric proportion of the ammonia or the desired amine is employed to react with the acid chloride groups, but an excess of ammonia or the amine can be employed. The reaction can be conducted at a temperature in the range of 5 to 100 degrees centigrade, preferably 25 to 75 degrees centigrade. An inert, liquid diluent, such as acetone or other lower aliphatic ketone, can be employed, if desired. Atmospheric pressure is usually employed, although super atmospheric pressure or vacuum can be employed, if desired. The reaction time can be varied from one to two minutes up to an hour or more. The resulting amides have the formula:

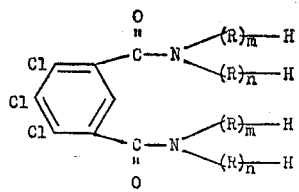

wherein $m$ and $n$ are integers from 0 to 1, and R is alkylene of one to six carbon atoms.

The following specific examples illustrate the preparation of the starting materials and products of the invention, but are not intended to limit it. All temperatures are in degrees centigrade, and parts are by weight unless indicated otherwise.

*Example 1.*—The preparation of 4,5,6-trichloroisophthalic acid

Three to four grams of the solid 4,5,6,α,α,α-hexachloro-3-toluyl chloride were refluxed with aqueous potassium hydroxide in excess until complete solution resulted (1½ hours). The solution was filtered and acidified with hydrochloric acid. A white solid was obtained weighing one to two grams. It recrystallized from a mixture of acetone and water as white feathery needles and had a melting point greater than 300 degrees centigrade. Analysis of the product showed it to have the following characteristics:

|  | Found | Calculated for $C_8H_3O_4Cl_3$ |
|---|---|---|
| Neutral equivalent | 135.0% | 134.8% |
| Chlorine content | 39.5% | 39.6% |

*Example 2.*—The preparation of 4,5,6-trichloroisophthaloyl chloride

Six grams of 4,5,6-trichloroisophthalic acid made by the method of Example 1 were reacted with an excess of phosphorus pentachloride. After the solution was made, it was refluxed for 10 to 15 minutes. The phosphorus oxychloride formed was stripped under vacuum and the residue, a solid, was recrystallized from hexane and found to have a melting point of 72 to 73 degrees centigrade. Analysis of the product showed it to have the following characteristics:

|  | Found | Calculated for $C_8HCl_5O_2$ |
|---|---|---|
| Neutral equivalent | 77.4% | 76.7% |
| Chlorine content | 57.4% | 57.9% |

*Example 3.*—The preparation of an amide of 4,5,6-trichloroisophthaloyl chloride Two grams (0.0065 mole) of 4,5,6-trichloroisophthaloyl chloride, prepared according to the method of Example 2, in 10 milliliters of acetone were added to 100 milliliters of concentrated ammonium hydroxide. The mixture was stirred five minutes, water was added and the white solid formed was collected. Recrystallization of the solid from isopropanol yielded white needles, having a melting point of 289 to 290 degrees centigrade. Analysis of the product showed it contained 39.6% chlorine. The calculated value for $C_8H_5Cl_3O_2N_2$ is 39.4% chlorine.

The 4,5,6-trichloroisophthalamide thus produced is useful as a fire retardant additive in a polyamide polymer.

*Examples 4 to 7*

Following the procedure of Example 3, additional amides of the invention are prepared as shown in the following table.

| Example No. | Amine Reactant | Amide Product |
|---|---|---|
| 4 | Ethyl amine | N,N'-diethyl-4,5,6-trichloroisophthalamide. |
| 5 | Hexyl amine | N,N'-dihexyl-4,5,6-trichloroisophthalamide. |
| 6 | Dibutyl amine | N,N,N',N'-tetrabutyl-4,5,6-trichloroisophthalamide. |
| 7 | Dimethyl amine | N,N,N',N'-tetramethyl-4,5,6-trichloroisophthalamide. |

In accordance with another aspect of the invention, 4,5,6-trichloroisophthaloyl chloride can be reacted with cyclic amines such as piperazine, morpholine and melamine. A specific example of this aspect of the invention follows:

*Example 8.—The preparation of an amide polymer of 4,5,6-trichloroisophthaloyl chloride*

A solution of 6.8 grams of piperazine and 10.6 grams of sodium carbonate in 250 milliliters of water was stirred vigorously. To the solution was added a solution of 30.6 grams of 4,5,6-trichloroisophthaloyl chloride in 125 milliliters of chloroform. The mixture was agitated by a high speed mixer for ten minutes. The chloroform phase was separated, and the chloroform was evaporated, to isolate the polymer. The resulting polymer contained nitrogen and chlorine by analysis and was used to form films.

Although this invention has been illustrated by citing specific details of given species embraced within the scope of the invention, it is to be understood that various modifications within the invention are possible without departing from the spirit and scope thereof.

I claim:
1. A compound having the formula

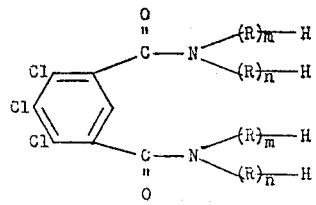

wherein $m$ and $n$ are from 0 to 1 and R is alkylene of one to six carbon atoms.

2. 4,5,6-trichloroisophthalamide.

References Cited

UNITED STATES PATENTS

| | | | |
|---|---|---|---|
| 1,591,245 | 7/1926 | Stockelbach | 260—515 |
| 2,551,891 | 5/1951 | Martin et al. | 260—558 |
| 2,670,373 | 2/1954 | Cusic | 260—558 |
| 2,733,230 | 1/1956 | Ufer | 260—78 |
| 2,868,769 | 1/1959 | Graham | 260—78 |
| 3,014,063 | 12/1961 | McLane et al. | 260—558 |
| 3,014,965 | 12/1961 | Newcomer et al. | 260—515 |
| 3,022,314 | 2/1962 | Aspergren et al. | 260—558 |
| 3,133,119 | 5/1964 | Nikawitz | 260—558 |
| 3,133,963 | 5/1964 | Horrom | 260—558 |

OTHER REFERENCES

Noller: Chemistry of Organic Compounds, 2nd ed., pp. 160–61, 237, and 244, Philadelphia, Saunders, 1958.

Pollak et al.: Monatshefte für Chemie, vol. 43, page 221 (1922).

JOHN D. RANDOLPH, *Primary Examiner.*

WILLIAM H. SHORT, WALTER A. MODANCE,
*Examiners.*

H. D. ANDERSON, N. TROUSOF, *Assistant Examiners.*